Oct. 19, 1926.  1,603,467
J. B. IRICK
ADVERTISING DEVICE
Filed May 4, 1925  2 Sheets-Sheet 1
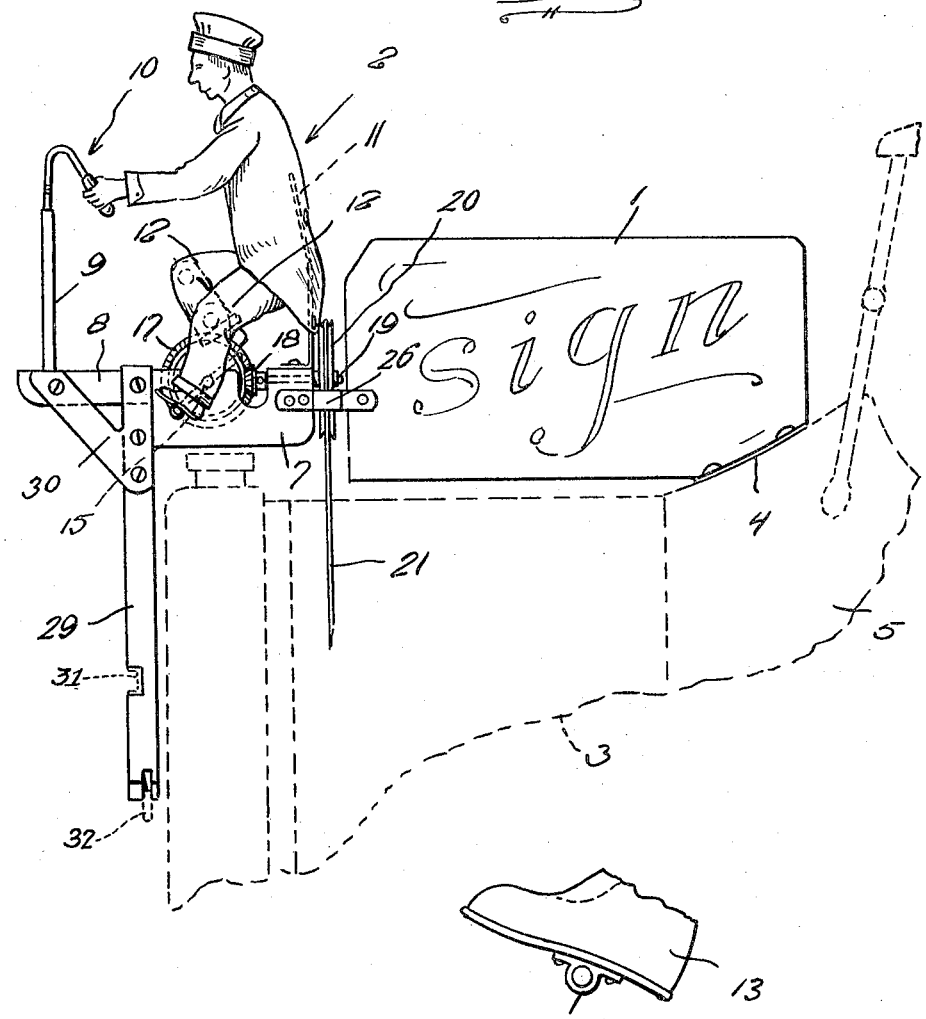

Oct. 19, 1926.
J. B. IRICK
1,603,467
ADVERTISING DEVICE
Filed May 4, 1925     2 Sheets-Sheet 2
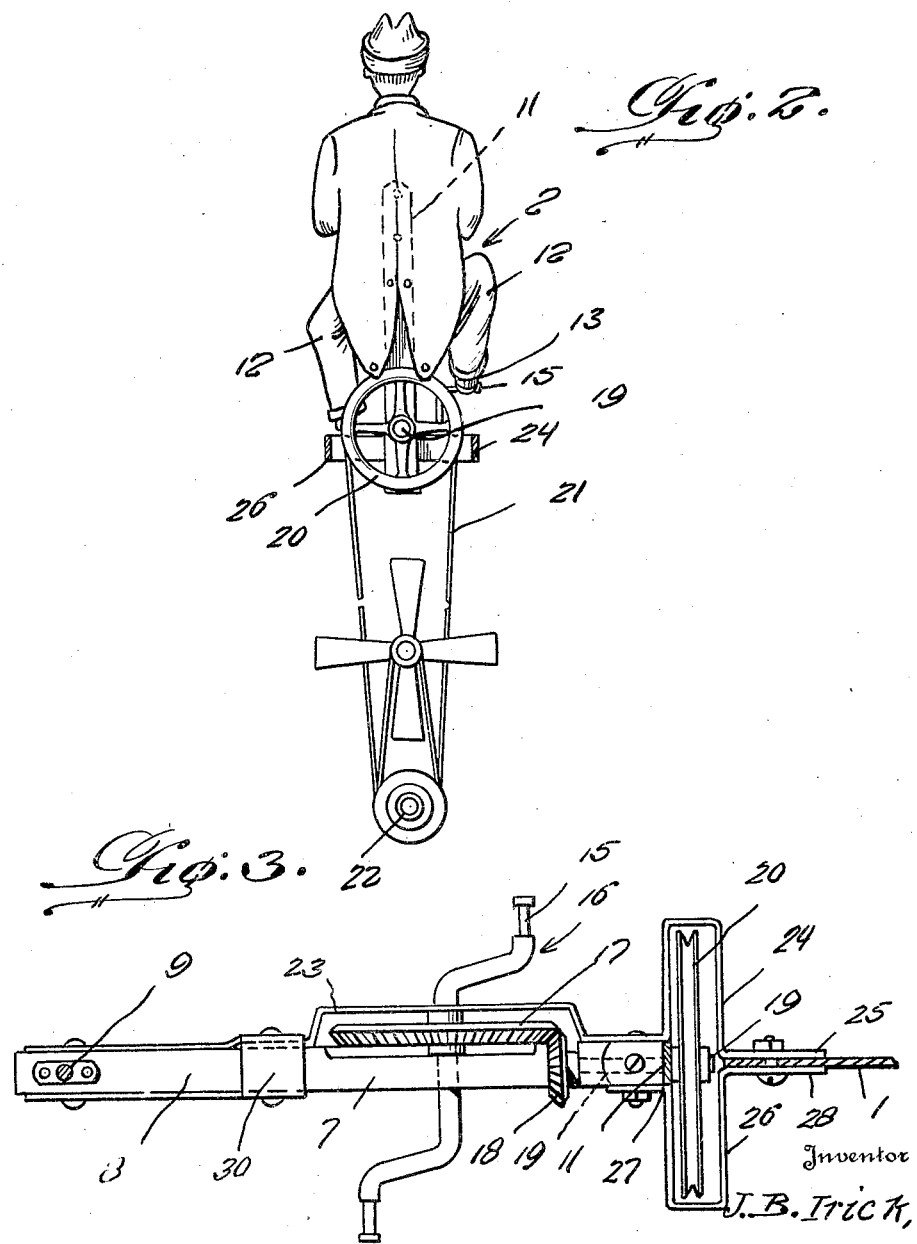

Patented Oct. 19, 1926.

1,603,467

UNITED STATES PATENT OFFICE.

JOHN B. IRICK, OF SHAWNEE, OKLAHOMA.

ADVERTISING DEVICE.

Application filed May 4, 1925. Serial No. 27,818.

This invention relates to an improved advertising device of the kind to be mounted upon a vehicle, such as an automobile, to permit it to be carried through the street for effective display.

Briefly, the invention has more particular reference to a device of this kind which embodies a sign to be supported above the engine hood and to extend lengthwise of the same, the sign having advertising matter on both sides, and there being a mechanical figure connected to one end of the sign and supported above the radiator for effectively attracting attention to the sign.

More particularly, the figure is the simulation of a boy or man riding a bicycle, the body of the figure being stationary, and the legs thereof being composed of jointed sections to provide a unique representation of a bicycle rider, the operating cranks for the legs being driven from flexible driving means operated from the fan belt shaft.

Another feature of construction is the novel means for supporting the figure together with the adjacent end of the sign, thereby providing a practical and sturdy assembly of parts capable of easy and ready application.

Other details, advantages, and features will become apparent from the following description and drawings.

In the accompanying drawings, forming a part of this application, and in which like numerals are employed to designate like parts throughout the same:

Figure 1 is a side elevation of an advertising device constructed in accordance with the invention showing the general manner of attaching the same to the forward portion of an automobile.

Figure 2 is a rear view of the figure showing the method of obtaining power from the fan shaft.

Figure 3 is a top plan with portions broken away and shown in section.

Figure 4 is a detail view of one of the foot bearings used in connection with the crank shaft.

Referring to the drawings in detail, 1 indicates a sign, 2 represents generally the figure simulation of a man riding a bicycle. The sign is in the form of an elongated plate and has appropriate advertising and display matter on opposite sides. It is to be positioned above the approximate center of the radiator 3 of an automobile or the like and one end thereof is provided with the attaching flange 4, by means of which it is connected to the cowl 4 just in front of the windshield. It will be noted that the forward end of the sign terminates rearward of the radiator 6, and a horizontal supporting member 7 is located over the radiator, the sign being connected to this member by novel means. The member 7 has a reduced extension 8 at its front, and rising from this extension is the standard 9, carrying imitation handle bars 10. The hands of the arms of the figure 2 are connected with the hand grip on the handle bars as shown. Extending upwardly from the opposite end of the supporting member is a metal strip 11 which is fastened to the body of the figure to hold it in a rigid state. It will be noted that the legs 12 of the figure are jointed so that they simulate the action of the legs of a person in riding a bicycle. So far as the construction of the figure is concerned, that is immaterial and constitutes no important part of the invention. It will be noted, however that the feet 13 are provided with bearing brackets 14, these brackets being connected with journals 15 on foot cranks 16. As shown better in Figure 3, the shaft of the cranks 16 is journaled between its ends on the aforesaid supporting member 7 and a relatively large bevelled gear 17 is connected to the intermediate portion thereof, this gear being in mesh with a pinion 18 at the forward end of a shaft 19 suitably mounted for rotation upon the supporting member. A grooved pulley 20 is keyed upon the shaft and a flexible driving member 21 is passed over this pulley, and as shown in Figure 2, is connected with the fan belt shaft 22, whereby to drive the cranks 16 from the fan shaft. In Figure 3, it will be seen that a reinforcing strip 23 is fastened to one side of the supporting member and is bowed intermediate its ends to accommodate and assist in the support of the beveled gear 17. The rear end portion of the strip is bent as at 24 to accommodate one of the pulleys 23, and the free end portion 25 is fastened to the adjacent end of the aforesaid sign 1. A U-shaped member 26 is disposed about the other half of the pulley and has its forward end fastened to the supporting member and its rear end 28 fastened to the sign.

As shown in Figure 1, the reference character 29 designates a depending leg which is connected with an appropriate part of the automobile to support the forward end of the supporting member. As illustrated the leg 29 is recessed to receive fender brace portions designated by 31 and 32, respectively, in Figure 1. A yoke 30 is connected to the top of the leg and the forward portion of the supporting member, which embodies suitable braces and cooperates with the forward end of the strip 23 as seen in Figure 3, to render the construction as rigid as possible.

From the foregoing description and drawings, it will be seen that when the fan shaft is set into rotation, the pulley 20 will be rotated to operate the shaft 19. Under the arrangement of the gearing shown, the crank 16 will be set into rotation, and inasmuch as the journals of the crank are connected to seat 13 of the figure 2, the jointed legs 12 will be operated to simulate the actions produced by a person in riding bicycles. Obviously, a mechanically operated figure of this kind will attract considerable attention from persons on the streets. By observing the figure, attention will naturally be given to the subject matter contained on the sign, and in this way an advantageous advertising medium will be had. No doubt persons will be able to obtain a clear understanding of the invention after reading the foregoing description in connection with the accompanying drawing. Therefore, a more lengthy description is thought unnecessary.

While the preferred embodiment of the invention has been shown and described, it is to be understood that minor changes coming within the field of invention claimed may be resorted to, if desired.

I claim:

1. In a motor vehicle and in combination, a longitudinally disposed sign secured above the hood of the automobile, rotary means disposed in front of said sign and connected therewith and supported by the front portion of the automobile, a figure disposed above said rotary means and having leg simulations connected with and operable by the rotary means, and means complementary to the rotary means and adapted to be connected with and driven by a rotary portion of the automobile.

2. In an automobile and in combination, a sign located above the hood of the automobile and secured at its rear end to the automobile, supporting means connected with and extending forwardly from the said sign, a support connected with the forward portion of the said supporting means and disposed upon and supported by a front portion of the automobile, rotary means carried by the said supporting means and disposed in front of the sign, a wheel in connection with said rotary means and adapted to be connected with and driven by a rotary portion of the automobile, and a figure arranged on said supporting means and above said rotary means and having portions operable by the latter; the said supporting means having a depending portion, and an upright being carried by said forwardly extending portion and connected with the said figure.

3. Advertising means for use on an automobile, comprising a sign, a support connected with and extending forwardly from said sign, said support having a pendent leg on its forward portion, and upright on the forward portion of the support, a figure mounted on the support and having arm simulations connected with said upright and also having movable leg simulations, rotary means carried by the support and connected with and adapted to operate said leg simulations, and a wheel connected with and disposed in rear of said rotary means and adapted to be connected with and driven from a rotary part of an automobile.

In testimony whereof I affix my signature.

JOHN B. IRICK.